United States Patent
Henry

(10) Patent No.: US 8,255,444 B2
(45) Date of Patent: Aug. 28, 2012

(54) METHOD AND DEVICE FOR FILTERING A MULTIDEMENSIONAL DIGITAL SIGNAL AND ASSOCIATED METHODS AND DEVICES FOR ENCODING AND DECODING

(75) Inventor: Felix Henry, Rennes (FR)

(73) Assignee: Canon Research Centre France, Cesson-Sevigne (FR)

( * ) Notice: Subject to any disclaimer, the term of this patent is extended or adjusted under 35 U.S.C. 154(b) by 1248 days.

(21) Appl. No.: 11/997,199

(22) PCT Filed: Jul. 31, 2006

(86) PCT No.: PCT/IB2006/003524
§ 371 (c)(1),
(2), (4) Date: Jan. 29, 2008

(87) PCT Pub. No.: WO2007/026264
PCT Pub. Date: Mar. 8, 2007

(65) Prior Publication Data
US 2008/0172434 A1    Jul. 17, 2008

(30) Foreign Application Priority Data

Jul. 29, 2005   (FR) ...................................... 05 08149

(51) Int. Cl.
*G06F 17/10*   (2006.01)
(52) U.S. Cl. .................................................. 708/308
(58) Field of Classification Search .................. 708/308
See application file for complete search history.

(56) References Cited

U.S. PATENT DOCUMENTS

| | | | | |
|---|---|---|---|---|
| 4,908,874 A | * | 3/1990 | Gabriel | 382/277 |
| 5,367,385 A | | 11/1994 | Yuan | 358/465 |
| 5,978,517 A | | 11/1999 | Henry et al. | 382/253 |
| 5,995,027 A | | 11/1999 | Henry | 341/50 |
| 6,047,090 A | * | 4/2000 | Makram-Ebeid | 382/257 |
| 6,215,422 B1 | | 4/2001 | Henry et al. | 341/51 |

(Continued)

FOREIGN PATENT DOCUMENTS
EP    0 822 515 A1    2/1998
(Continued)

OTHER PUBLICATIONS

Thackray, B.D., et al.; "Semi-Automatic Segmentation of Vascular Network Images Using a Rotating Structuring Element (ROSE) with Mathematical Morphology and Dual Feature Thresholding", IEEE on Transactions on Medical Imaging, vol. 12, No. 3, pp. 85-392, Sep. 1, 1993.

(Continued)

*Primary Examiner* — Tan V. Mai
(74) *Attorney, Agent, or Firm* — Fitzpatrick, Cella, Harper & Scinto

(57) ABSTRACT

The invention relates to a method of filtering a multidimensional digital signal comprising a plurality of samples, and comprises the following steps applied to each of the samples to filter, simulating the filtering of the sample to filter by applying at least one filter in a plurality of geometric orientations in the digital signal (S52), the simulation resulting in a plurality of simulated filtering values of the sample, and obtaining a filtering value of the filtered sample on the basis of the plurality of simulated filtering values of the sample according to at least one predetermined criterion (S58).

36 Claims, 6 Drawing Sheets

U.S. PATENT DOCUMENTS

| | | | |
|---|---|---|---|
| 6,333,705 B1 | 12/2001 | Amonou et al. | 341/107 |
| 6,498,866 B2 | 12/2002 | Charrier et al. | 382/248 |
| 6,501,860 B1 | 12/2002 | Charrier et al. | 382/240 |
| 6,631,213 B1 | 10/2003 | Amonou et al. | 382/232 |
| 6,778,608 B1 | 8/2004 | Berthelot et al. | 375/240.18 |
| 6,801,666 B1 | 10/2004 | Henry et al. | 382/240 |
| 7,027,656 B2 | 4/2006 | Henry et al. | 382/239 |
| 7,088,858 B2 | 8/2006 | Henry | 382/173 |
| 7,207,030 B2 * | 4/2007 | Kuchler et al. | 430/5 |
| 7,315,648 B2 | 1/2008 | Henry | 382/173 |
| 2003/0031369 A1 | 2/2003 | Le Pennec et al. | 382/232 |
| 2003/0154173 A1 | 8/2003 | Henry | 705/400 |
| 2004/0120590 A1 | 6/2004 | Fuchs et al. | 382/239 |
| 2004/0120592 A1 | 6/2004 | Fernandes | 382/240 |
| 2005/0053299 A1 | 3/2005 | Fuchs et al. | 382/239 |
| 2005/0100224 A1 | 5/2005 | Henry et al. | 382/232 |
| 2006/0050789 A1 | 3/2006 | Gisquet et al. | 375/240.23 |
| 2006/0088221 A1 | 4/2006 | Henry et al. | 382/232 |
| 2008/0130736 A1 | 6/2008 | Onno et al. | 375/240.01 |

FOREIGN PATENT DOCUMENTS

| | | |
|---|---|---|
| WO | WO 2004/056120 A1 | 7/2004 |

OTHER PUBLICATIONS

Paplinski, A.P.; "Directional Filtering in Edge Detection", IEEE Transactions on Image Processing, vol. 7, No. 4, pp. 611-615, Apr. 4, 1998.

Adams, M.D. et al., Reversible Integer-to-Integer Wavelet Transforms for Image Compression: Performance Evaluation and Analysis, IEEE Transactions on Image Processing, vol. 9, No. 6, Jun. 2000.

* cited by examiner

METHOD AND DEVICE FOR FILTERING A MULTIDEMENSIONAL DIGITAL SIGNAL AND ASSOCIATED METHODS AND DEVICES FOR ENCODING AND DECODING

The present invention relates to a method and a device for filtering a multidimensional digital signal, a method and a device for encoding a multidimensional digital signal, and a method and a device for decoding an encoded multidimensional digital signal.

The present invention relates in general to the filtering, encoding and decoding of multidimensional digital signals, in particular of images or videos.

A particularly advantageous, but not exclusive, preferred application of the present invention is filtering using directional filters and the encoding/decoding of digital signals.

In the case, for example, of a digital image coming from a digital camera, this is constituted by a set of N×M pixels, where N is the height of the image in pixels and M the width of the image. The image thus obtained is encoded before being stored in a memory. The initial data, in other words the information representing the image pixels, is organised into a two-dimensional array that can be accessed, for example, line by line.

A digital image is subject to a transform prior to being encoded, and in the same way, during the decoding of an encoded digital image, the image is subject to an inverse transform. The transform consists in applying a filter to all or part of a digital image.

A filter is a convolution product between the image signal and a predetermined vector that allows, for each pixel of the area to which it applies, its value to be modified according to the values of the neighbouring pixels, with assigned coefficients.

There is in particular one filtering technique, known through patent WO 2004056120, which allows the quantity of information contained in the frequency sub-bands of an image to be reduced. This technique is based on the technique of decomposition into bandlets. Using decomposition into bandlets to filter an image, the signal is first analysed so as to detect local regularities in the stream. Indeed, the signal parts that have a homogenous stream are isolated and filtered taking account of the direction of the stream. Thus, filtering generates a signal which contains less information than the non-filtered signal and the resulting compression is therefore more effective.

However, this technique requires a great number of calculations. Indeed, the signal has to be analysed so as to identify the parts that have a homogenous stream, which is a complex operation.

Moreover, this technique does not allow separability. It will be remembered that filtering has the property of separability when it can be applied independently to the different dimensions of the signal, for example along the lines and along the columns or vice versa.

It would consequently be advantageous to be able to carry out a filtering operation while taking account of the separability property, of little complexity, while maintaining a good level of compression.

The present invention aims firstly to provide a method of filtering a multidimensional digital signal comprising a plurality of samples. The method comprises the following steps applied to each of the samples to filter:

simulating the filtering of the sample to filter by applying at least one filter in a plurality of geometric orientations in the digital signal, the simulation resulting in a plurality of simulated filtering values of the sample, obtaining a filtering value of the filtered sample on the basis of the plurality of simulated filtering values of the sample according to at least one predetermined criterion.

The filtering method according to the invention provides for the filtering of a multidimensional signal while taking account of local variations so as to increase filtering performance.

The method more particularly allows filtering to be carried out that takes account of the local orientation of the digital signal stream while maintaining the separability.

This method is particularly applicable in the context of a filtering mechanism prior to a compression algorithm. It allows the quantity of information present in the frequency sub-bands produced by filtering to be reduced. In this way, the compression of the signal with a view to its storage or its transmission is improved.

Furthermore, this method offers the advantage of straightforward material implementation and great rapidity of calculation.

It will be noted that the multidimensional digital signal can be an image, a video or, in general, a signal representing multimedia data.

According to one characteristic, the step of obtaining the filtering value consists in selecting a value from the plurality of simulated filtering values.

According to this characteristic, the simulation step provides the filtering value without there being any need to reapply the filtering mechanism, which allows the filtering process to be optimised.

According to another characteristic, the step of obtaining the filtering value comprises the following steps:

determining a geometric orientation among the plurality of geometric orientations in the digital signal on the basis of the plurality of simulated filtering values and applying the filtering in the determined geometric orientation.

According to this characteristic, at the end of the simulation step, the most appropriate geometric orientation is determined, so as to increase filtering performance.

According to one characteristic, prior to the step of simulating the filtering, the method comprises a step of determining at least one filter among a plurality of filters.

It is therefore possible to call on the most appropriate filter or filters to carry out the filtering operation according to the invention.

According to one embodiment, the plurality of filters comprises at least one low-pass filter and one high-pass filter.

According to one variant, the filtering value obtained according to at least one predetermined criterion corresponds to the smallest absolute value from the plurality of simulated filtering values of the sample.

Thus, the quantity of information produced by the filtering is reduced, which increases the compression performance of the sample.

According to another variant, the filtering value obtained according to at least one predetermined criterion corresponds to the value, from the plurality of simulated filtering values of the sample that minimizes the rate of transmission of the filtered and encoded samples.

Thus, the quantity of information produced by the filtering is reduced. According to a yet another variant, the filtering value obtained according to at least one predetermined criterion corresponds to the value, from the plurality of simulated filtering values of the sample that minimizes the errors.

Thus, the errors are minimized relative to the original signal particularly, during the filtered sample quantization step.

According to one characteristic, the method comprises a step of obtaining the predetermined criterion from information stored in a memory means.

According to one characteristic, the method comprises a step of obtaining information representing the geometric orientation of the filter applied to the sample.

This information is useful when decoding the encoded samples which have been subject to the aforementioned filtering.

According to another characteristic, the method comprises a step of associating with the filtered sample information representing the geometric orientation of the filter applied to the sample.

This association of the information representing the geometric orientation with the filtered sample makes it possible to find out, during the inverse filtering, the orientation information required to apply the inverse filtering.

According to one characteristic, the method comprises a step of associating with the filtered sample information representing the filter applied to the sample.

According to one characteristic, the steps of the filtering method are successively applied to each of the dimensions of the digital signal.

Another purpose of the present invention is to provide a method of encoding multidimensional digital signal comprising a plurality of samples. The method comprises a method of filtering the digital signal as disclosed above.

The application of filtering according to the invention in the encoding method makes it possible to significantly improve the encoding of the samples of a digital signal.

As a matter of fact, the entropy of the frequency sub-bands, in other words the quantity of information existing in the frequency sub-bands, is reduced by more than 25% through the invention.

According to one characteristic, when the filtering comprises a step of associating with the filtered sample information representing the geometric orientation of the filter applied to the filtered sample, encoding of the filtered sample is performed with loss with respect to the filtered data and without loss with respect to the information representing the geometric orientation.

It is in fact preferable not to lose information on the geometric orientation of filtering in order to be able to carry out the inverse filtering operations effectively.

According to one characteristic, the filtering of samples of the digital signal used in application of a lifting scheme is performed with at least two filters which are each applied to different samples.

In this way, the filtering operation, and thereby the transform operation, do not take up a great deal of memory. As a matter of fact, by using the lifting scheme, the samples are replaced while they are being filtered.

Another purpose of the present invention is to provide a method of decoding an encoded multidimensional digital signal comprising a plurality of encoded samples, the method comprising a step of partial decoding leading to a plurality of filtered samples. The method comprises a step of inverse filtering applied to filtered samples, the inverse filtering being performed on a filtered sample in the geometric orientation of the filter which was used for the filtering of the sample during the encoding thereof according to the encoding method as described above.

According to one characteristic, the geometric orientation is defined on the basis of information representing the geometric orientation of the filter applied to that sample and which is associated with the filtered sample.

According to another characteristic, the method comprises a step of obtaining the information representing the geometric orientation from a memory means.

According to one characteristic, the filtering of the samples of the filtered digital signal used in application of a lifting scheme is performed with at least two filters which are each applied to different samples.

Correlatively, the invention also provides a device for filtering a multidimensional digital signal comprising a plurality of samples. The device comprises the following means applied to each of the samples to filter:

means for simulating the filtering of the sample to filter adapted to apply at least one filter in a plurality of geometric orientations in the digital signal, the simulation means generating a plurality of simulated filtering values of the sample, means for obtaining a filtering value of the filtered sample on the basis of the plurality of simulated filtering values of the sample according to at least one predetermined criterion.

This device has the same advantages as the filtering method briefly described above.

Another purpose of the present invention is to provide a device for encoding a multidimensional digital signal comprising a plurality of samples. The device comprises a device for the filtering of samples as shown above.

This device has the same advantages as the encoding method briefly described above and they will not be restated here.

Another purpose of the present invention is to provide a device for decoding an encoded multidimensional digital signal comprising a plurality of encoded samples, the device comprising means for partial decoding generating a plurality of filtered samples. The device comprises inverse filtering means able to be applied to filtered samples, the inverse filtering being performed on a filtered sample in the geometric orientation of the filter which was used for the filtering of the sample during the encoding thereof by implementing an encoding device as disclosed above.

This device has the same advantages as the decoding method briefly described above and they will not be restated here.

According to another aspect, the invention relates to a telecommunications system comprising a plurality of terminal devices connected via a telecommunications network. The telecommunications system comprises at least one terminal device equipped with a device for encoding a multidimensional digital signal comprising a plurality of samples as shown above and at least one terminal device equipped with a device for decoding an encoded multidimensional digital signal comprising a plurality of encoded samples as described above.

According to yet another aspect, the invention relates to computer programs that can be loaded into a computer system, said programs containing instructions enabling the implementation of method of filtering a multidimensional digital signal comprising a plurality of samples, the method of encoding a multidimensional digital signal comprising a plurality of samples and the method of decoding an encoded multidimensional digital signal as shown above, when these programs are loaded and executed by a computer system.

Other aspects and advantages of the present invention will emerge more clearly from reading the following description, this description being given solely as a non-restrictive example and made with reference to the appended drawings, in which.

Figure 1:
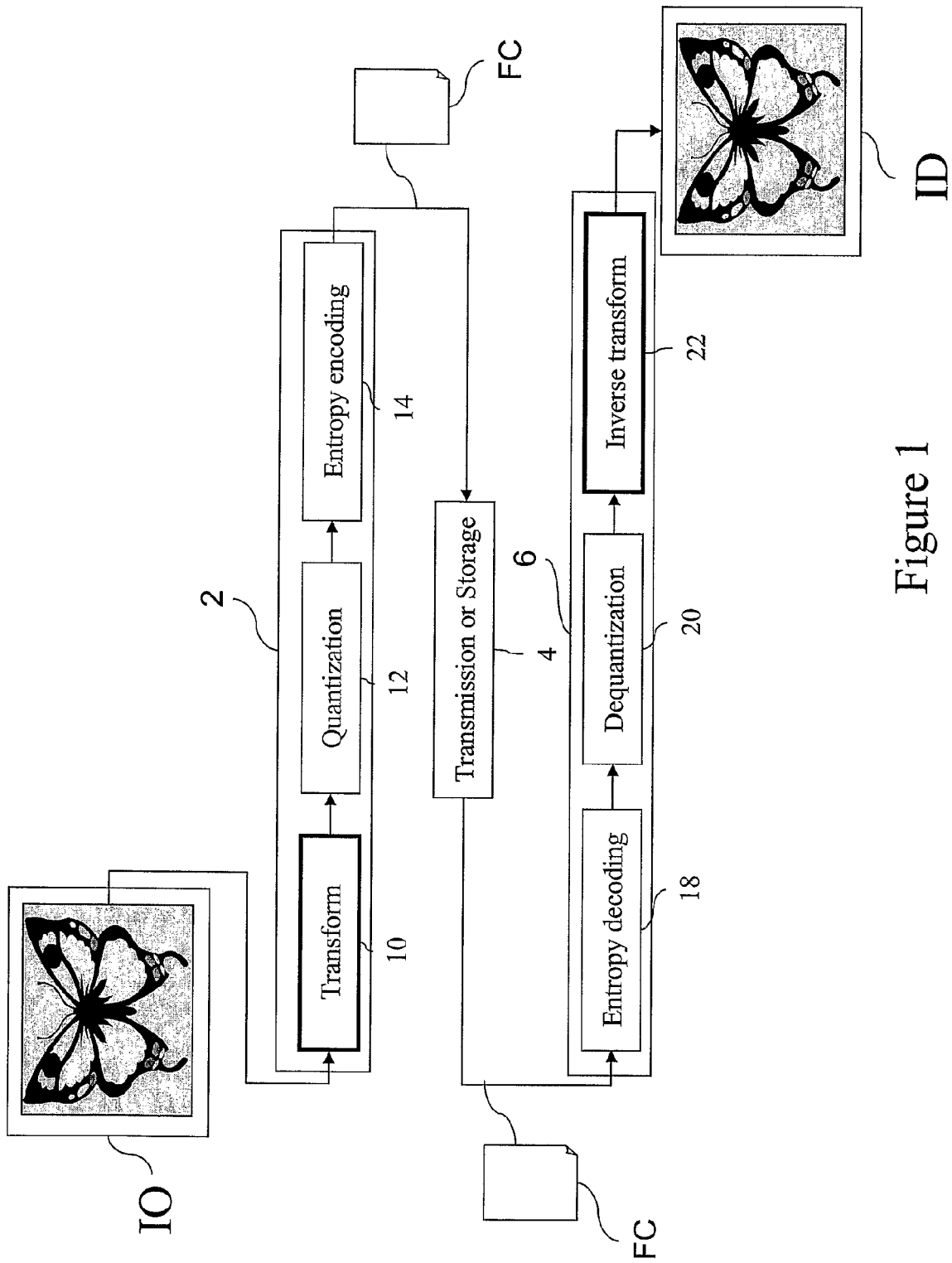
FIG. 1 shows in a simplified way a system for processing digital images in which the encoding/decoding methods and devices according to the invention are implemented.

With reference to FIG. 1 and as designated by the general reference number denoted 1, a system for processing digital images, particularly by encoding and decoding according to the invention, involves an encoding device 2, a unit 4 and a decoding device 6.

It will be noted here that the encoding/decoding methods and devices according to the invention find a particularly advantageous application in a telecommunications system comprising a plurality of terminal devices connected via a telecommunications network. The encoding/decoding methods according to the invention are then implemented in the terminal devices of the system so as to authorise a transmission of files via the telecommunications network and, thus, to reduce traffic and transmission times.

According to another particularly advantageous application, the encoding/decoding methods according to the invention are implemented in a device for the storage of multimedia entities so as to be able to store a great quantity of data in a storage unit.

As shown in FIG. 1, the encoding device 2 according to the invention receives as an input an original image IO. The image IO is processed by the encoding device 2 which issues as an output an encoded file FC.

The processing executed in the encoding device 2 consists in performing the transform, quantization and entropy encoding steps carried out in the respective units 10, 12 and 14. The transform step is the step which implements the filtering method according to the invention whereas the quantization and entropy encoding steps implement conventional means.

The encoded file FC is provided to the unit 4, for example, to be transmitted via a network or to be stored in a storage unit.

The decoding device 6 receives as an input the encoded file FC coming from the unit 4 and provides as an output a decoded image ID substantially identical to the original image IO.

During decoding, the encoded image is subject to the successive steps of entropy decoding, dequantization and inverse transform carried out in the respective units 18, 20 and 22. The inverse transform step is the step which implements the filtering according to the invention while the dequantization and entropy decoding steps implement conventional means.

Generally, the initial data corresponding to the original image IO is organised in a two-dimensional array that can be accessed line by line.

The embodiment described hereinafter shows the encoding and decoding of a fixed digital image, in other words a two-dimensional signal. However, the principle is identical for a signal that has a greater number of dimensions, for example a video, which, for its part, has three dimensions.

A description will now be given of the encoding of a digital image comprising, in particular, a filtering mechanism according to the invention during decomposition into frequency sub-bands. This filtering can be, for example, implemented in the JPEG 2000 standard, during filtering, which is also called decomposition into wavelets.

For further information concerning the JPEG 2000 standard, the reader is referred in particular to the following address: www.jpeg.org.

Figure 2:
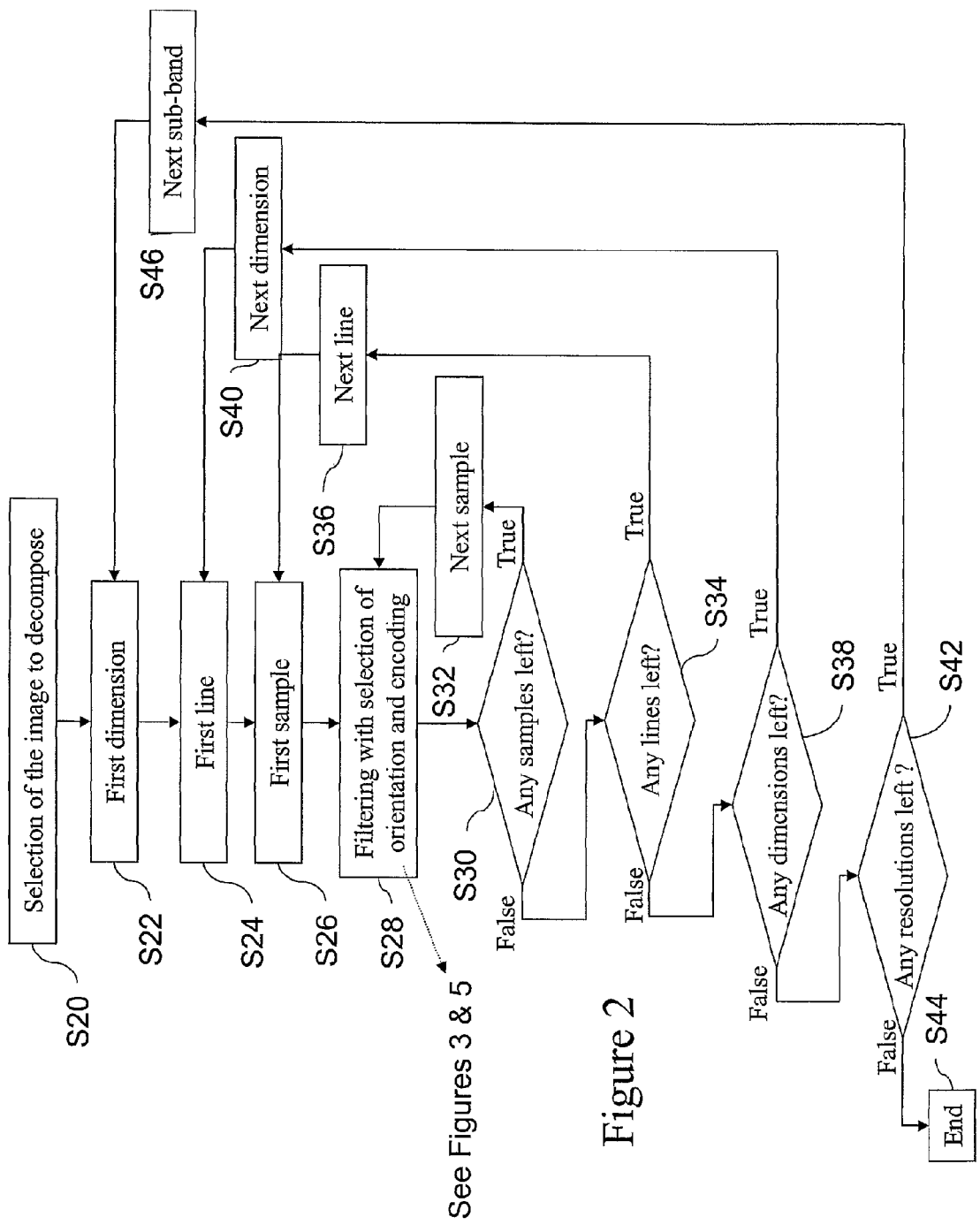
FIG. 2 shows the algorithm for processing the samples of a digital image with a view to encoding them.

FIG. 2 shows an algorithm for encoding a digital image comprising filtering according to the invention.

Filtering in sub-bands consists in applying a filtering operation to an original signal in order to generate one or more sub-bands corresponding to different frequencies. These sub-bands taken together correspond to a given resolution.

It is then common to select one or more of these sub-bands in order to decompose them again into sub-bands, which will in their turn constitute the next resolution. This process may be iterated several times depending on the required resolution.

The algorithm starts at step S20 during which the initial image is selected, which is considered as a frequency sub-band to filter.

This step is followed by step S22 consisting in selecting a first dimension on which processing will be performed.

According to one embodiment, the horizontal dimension of the current frequency sub-band is considered as the first dimension. However, in another embodiment, the vertical dimension of the current frequency sub-band may be considered as the first dimension.

Step S22 is then followed by step S24 for the selection of the first line of the current dimension. This first line is therefore the current line.

According to one particular embodiment, when the horizontal dimension is selected, it is the first line of pixels of the current sub-band.

Conversely, if the vertical dimension is selected, the first line of the current dimension is the first column of pixels of the current sub-band.

Step S24 is followed by step S26 for the selection of the first sample to process in the current line.

According to one particular embodiment, the first sample to process in the current line is either the first sample in the lexicographic order, in other words the sample furthest to the left when the line is a horizontal line of pixels, and the uppermost sample when the line is a column of pixels, or the second sample of the line if the line is filtered for the second time.

Step S26 is followed by step S28 during which the current sample to filter is filtered and the filtered sample is encoded.

Filtering according to the invention may be used for different conventional objectives, particularly low-pass filtering also known as blurring, high-pass filtering, also known as contour detection.

The purpose of low-pass filters is to attenuate the components of the image that have a high frequency (dark pixels). This type of filtering is generally used to attenuate image noise, which is why we habitually talk of smoothing.

Averaging filters are a type of low-pass filter, the principle of which is to affect the average of the values of the pixels neighbouring the pixel to filter. The result procured by this filter is a more blurred image than the original image.

High-pass filters, unlike low-pass filters, attenuate the low frequency components of the image and make it possible, in particular, to accentuate details and contrast, which is why the term "accentuation filter" is used.

According to a particular embodiment, in order to allow effective compression of the signal, decomposition into frequency sub-bands according to the lifting scheme is, for example, used. The filtering and encoding step S28 implementing this kind of decomposition will be described hereinafter with reference to FIG. 3.

For further information on the lifting scheme, the reader is referred in particular to the document entitled "Reversible Integer-To-Integer Wavelet Transforms for Image Compression: Performance Evaluation and Analysis" by M. D. Adams and F. Kossentini, IEEE Transactions on Image Processing, Vol. 9, No. 6, June 2000, pages 1010-1024. This document describes a filtering technique, namely the transform into sub-bands by the so-called lifting scheme technique, the principle of which is to use the correlations present in the signal to lead to a more compact set of information and, thus, to reduce signal entropy.

The lifting scheme is a particular implementation of transform into wavelets, which performs two successive filtering operations, a first high-pass filtering and a second low-pass filtering, and each sample is replaced by the result of its filtering.

For example, the lifting scheme performs a first passage selecting samples with an uneven position, with a view to filtering them with a high-pass filter and replacing them. Then, the lifting scheme performs a second passage selecting samples with an even position, with a view to filtering them with a low-pass filter and replacing them.

After thus filtering and encoding the current sample, step S28 is followed by step S30 which carries out a test in order to determine if there are any samples remaining to be filtered on the current line.

If, at step S30, the response is positive, this step is followed by step S32 where the next sample is selected on the current line.

According to one particular embodiment, the next sample is placed N samples after the current sample in the run order of the samples, where N is a predetermined value. For example, N may take the value 2.

According to one embodiment variant, the next sample is the one immediately following the current sample.

This step of selecting the next sample S32 is followed by step S26 previously described.

Back at step S30, if the response is negative, then the algorithm is pursued at step S34 which moves to a test in order to determine if there remains a least one line to process in the current dimension.

If, at step S34, the response is positive, this step is followed by step S36 where the next line is selected in the current dimension.

According to a particular embodiment, that the next line is the same line as the current line if this line was processed just once or it is the next line if the current line has already been processed twice.

According to an embodiment variant, the next line is the one immediately following the current line.

According to another embodiment variant, the next line is placed M lines after the current line, in the run order of the lines where M is a predetermined value. For example, M may take the value 2.

Step S36 is followed by step S26 described previously.

Back at step S34, if the response is negative, then the algorithm is pursued at step S38 which moves to a test in order to determine if there remains at least one dimension to run through.

According to a particular embodiment, the horizontal dimension is filtered first, in other words, the lines of the digital image are processed, then the vertical dimension, in other words the columns of the digital image are processed.

According to a second embodiment, the vertical dimension is filtered first, in other words the columns of the digital image are processed, then the horizontal dimension, in other words the lines of the digital image are processed.

In the case of a video, the three dimensions, horizontal, vertical and temporal are to be filtered successively.

Thus, at test step S38, a determination is made as to whether the two dimensions have been processed.

If the response is positive, this step is followed by step S40 where the next dimension to process is selected.

According to the particular embodiment, where there are only two dimensions to process, thus the next dimension is the vertical dimension.

Step S40 is then followed by step S24 described previously.

Back at step S38, if the response is negative, then the algorithm is pursued at step 842 which moves to a test in order to determine whether there remains at least one resolution to process.

As a matter of fact, in the embodiment described, provided a sub-band has been filtered according to each of the dimensions, thus generating a certain number of new frequency sub-bands, the process is reiterated by applying to one of the frequency sub-bands thus generated.

However, at each iteration, the size of each sub-band diminishes and at a given moment, this iterative process stops.

The iterative process is executed a predetermined number of times, for example three times.

This test step therefore consists in verifying whether the anticipated number of iterations has been performed or not.

If this is the case, the algorithm ends at step S44.

In the opposite event, the next step is step S46 for selecting the next frequency sub-band on which the filtering and encoding method is reiterated.

According to one embodiment, the next sub-band selected is, of all the sub-bands produced during the current iteration, the sub-band which issues from a low-pass filtering in each of the dimensions.

Step S46 is then followed by step S22 previously described and the algorithm is executed again.

Figure 3:
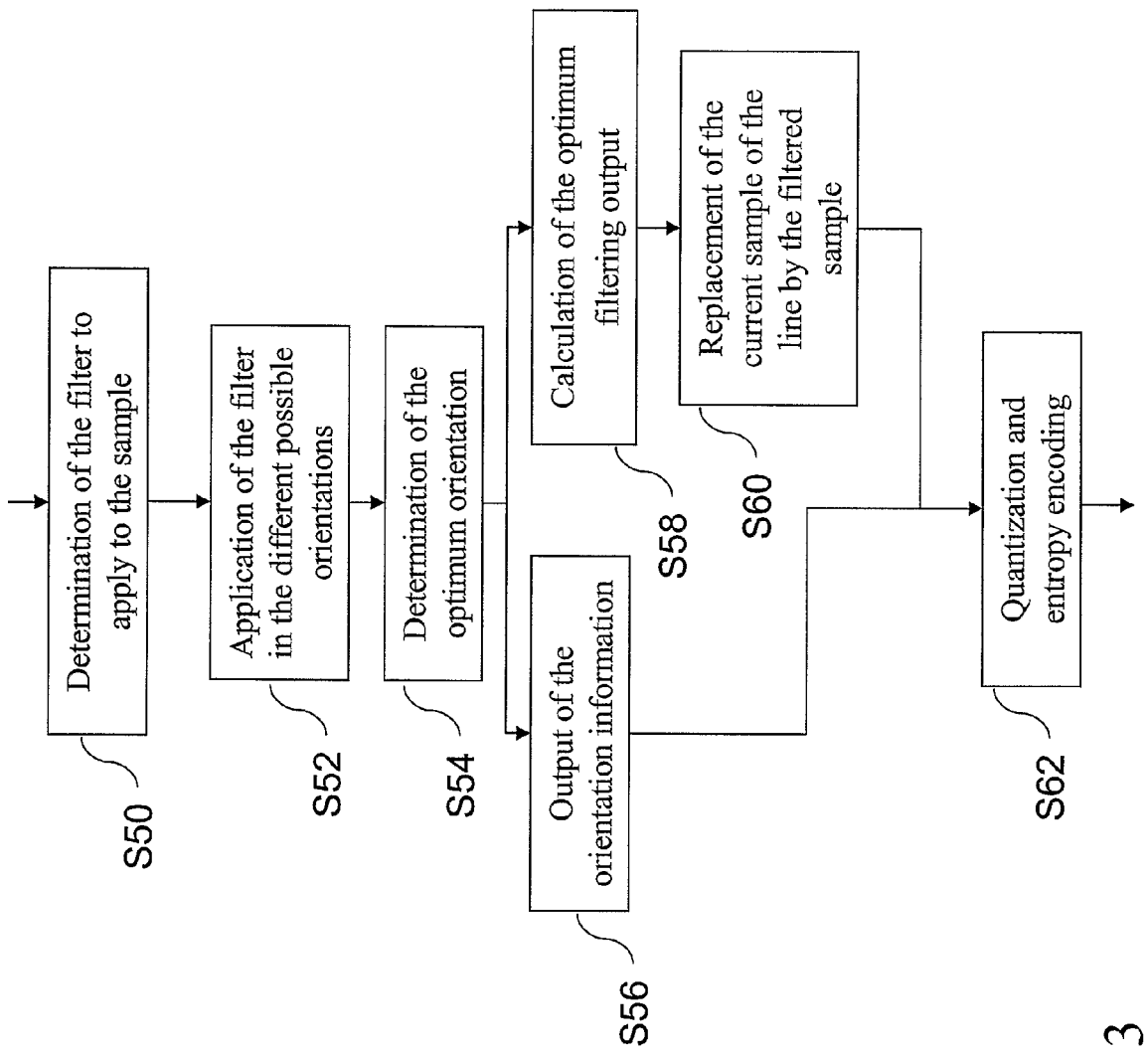
FIG. 3 shows the algorithm for filtering, quantizing and encoding a sample.

The filtering and encoding of a sample, according to the invention, will now be described with reference to FIG. 3.

This process starts at step S50 during which the filter to be applied is determined among a plurality of possible filters.

According to a particular embodiment, two filters are conceivable.

A first filter, known as a low-pass filter, has the role of extracting the low frequencies from the signal.

The result of filtering a mono-dimensional signal, in other words formed of a series of samples $\{\ldots, x_{i-3}, x_{i-2}, x_{i-1}, x_i, x_{i+1}, x_{i+2}, x_{i+3}, \ldots\}$ via the low-pass filter whose coefficients are $[-1/16, 0, 5/16, 1, 5/16, 0, -1/16]$ is provided by the following values $y_i = -x_{i-3}/16 + 5*x_{i-1}/16 + x_i + 5*x_{i+1}/16 - x_{i+3}/16$.

A second filter known as a high-pass filter extracts the high frequencies from the signal.

The result of filtering a mono-dimensional signal $\{\ldots x_{i-3}, x_{i-2}, x_{i-1}, x_i, x_{i+1}, x_{i+2}, x_{i+3}, \ldots\}$ via the low-pass filter whose coefficients are $[1/16, 0, -9/16, 1, -9/16, 0, 1/16]$ is provided by the following values $y_i = x_{i-3}/16 - 9*x_{i-1}/16 + x_i - 9*x_{i+1}/16 + x_{i+3}/16$.

The high-pass and low-pass filters are used in decomposition according to the lifting scheme.

When filtering a line, if the line being filtered is filtered for the first time, the filter applied is the high-pass filter.

In the opposite event, the filter to apply is the low-pass filter.

Step S50 is followed by step S52 during which the filter determined is applied in different possible geometric orientations in order to simulate the filtering operation.

Figure 4:
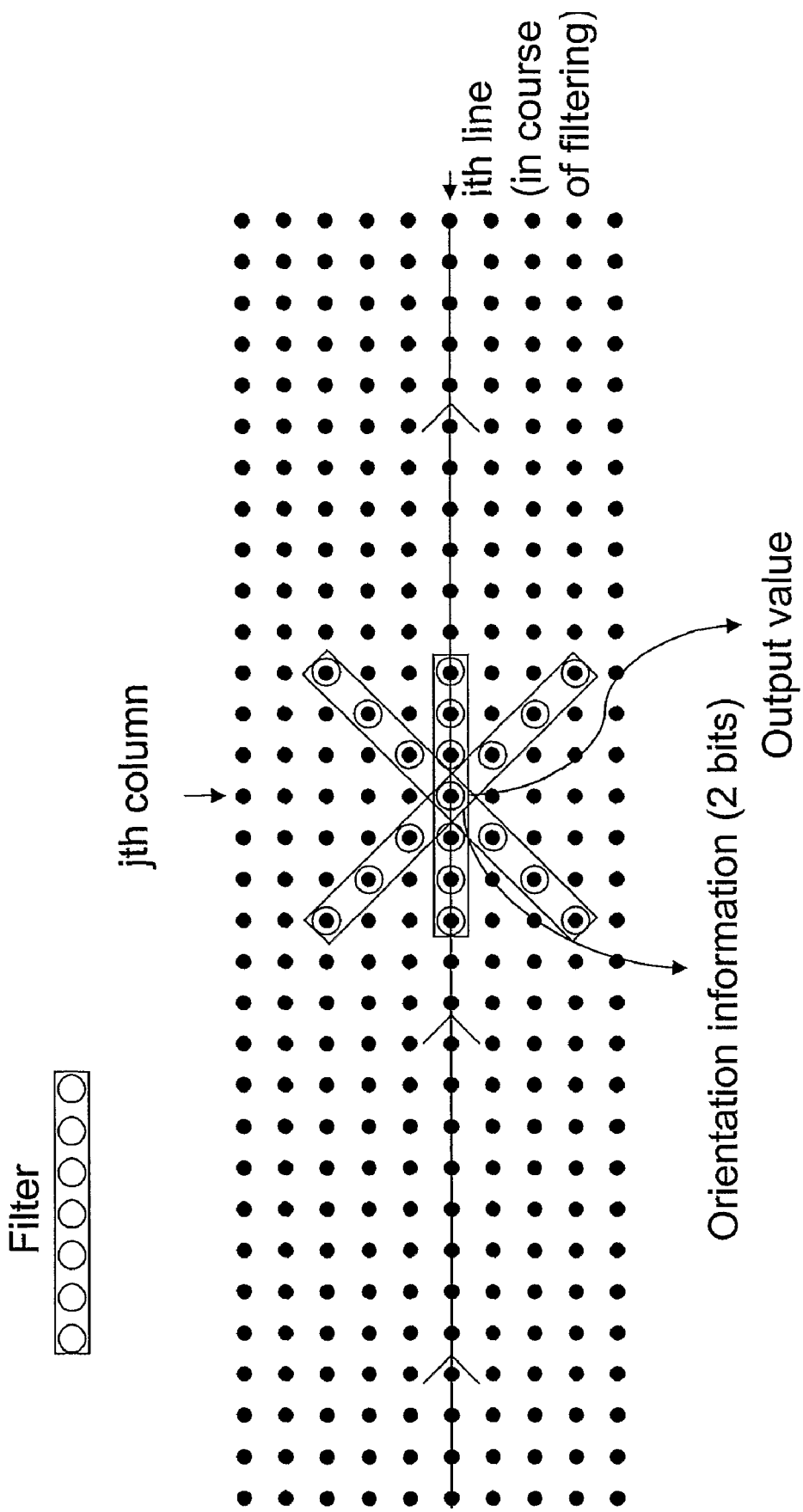
FIG. 4 shows, according to one example, the filtering simulation in three possible geometric orientations.

This step is shown by means of an example, in FIG. 4.

In this figure is shown the current filter which is to be applied to the digital image and the application of this filter to the current sample. According to the example considered, the current sample is the one corresponding to the ith line and the jth column.

In the embodiment shown in FIG. 4, three geometric orientations are possible.

The coefficient of the current sample of line number i and column number j is denoted $x_{i,j}$.

Thus, the three geometric orientations according to which the mono-dimensional filtering is applied are defined as follows:

$$\{x_{i-3\ j-3}, x_{i-2\ j-2}, x_{i-1\ j-1}, x_{i\ j}, x_{i+1\ j+1}, x_{i+2\ j+2}, x_{i+3\ j+3}\}$$
$$\{x_{i\ j-3}, x_{i\ j-2}, x_{i\ j-1}, x_{i\ j}, x_{i\ j+1}, x_{i\ j+2}, x_{i\ j+3}\}$$
$$\{x_{i+3\ j-3}, x_{i+2\ j-2}, x_{i+1\ j-1}, x_{i\ j}, x_{i-1\ j+1}, x_{i-2\ j+2}, x_{i-3\ j+3}\}$$

Thus, according to this embodiment, at step S52, the filtering determined is applied at step S50 to the sample $x_{i,j}$ to filter in the three geometric orientations previously cited, so as to simulate filtering in the different possible geometric orientations.

The simulation step therefore makes provision for calculating the output of each of the three aforementioned filtering operations, thus obtaining a plurality of simulated filtering values.

This step S52 is followed by step S54 which will determine among the different geometric orientations the geometric orientation which is to be used for applying filtering to the current sample.

The geometric orientation to be taken into account for applying filtering is determined on the basis of the plurality of simulated filtering values on the basis of one or more predetermined criteria.

Thus, according to the example considered in FIG. 4, the selection is made on the basis of the three values obtained after applying the filter in the three geometric orientations described, taking into account at least one predetermined criterion.

According to one embodiment of the determination of the geometric orientation of filtering, the filtering is chosen which generates a simulated filtering value whose absolute value is smallest among the values obtained.

However, other embodiments can be used.

Thus, in particular, the filtering value can be chosen which minimizes the rate, in other words the value that can be encoded on a minimum number of binary elements.

According to another embodiment, the filtering value is chosen which minimizes the error, in other words the value which, once quantized by the subsequent quantization step, generates minimal error relative to the original signal.

According to yet another embodiment, a filtering value is selected that allows both the rate to be minimized and the error to be minimized.

Furthermore, provision may be made, in one embodiment variant, for the coefficients of the filter to change according to its orientation.

Step S54 which has just been described is then followed by an optional step S56 and steps S58 and S60.

During step S56, the information representing the orientation of the filter applied to the current sample will be stored. As a matter of fact, it is necessary to store this geometric orientation information with a view to encoding the digital image.

The information representing the filtering determined is stored in the compressed file and is possibly subject to an entropy encoding step as described hereinafter.

This step is however optional insofar as the orientation information was already known and therefore previously stored.

According to step S58, the current sample filtering output is calculated in the geometric orientation of filtering previously determined.

It is alternatively possible to reuse, during step S58, the value calculated during step S52 and to use it as a real filtering value.

This step S58 is followed by step S60 which consists in replacing the current sample by the value of the filtered sample.

During the next step S62, the filtered sample is quantized and then entropically encoded so as to be stored in a compressed file, transmitted or stored temporarily for subsequent filtering.

The quantization can be scalar quantization as well as vectoral quantization, or any type of quantization.

As far as entropy encoding is concerned, this may be carried out by means of Huffman encoding or arithmetical encoding.

It will be noted that an entropy encoding is applied to the orientation information previously stored, without quantization.

The algorithm for decoding a filtered and encoded image will now be described with reference to FIGS. 2, 3 and 5.

The decoding algorithm resumes the steps of the algorithm in FIG. 2, with the exception however of step S28, which will be described with reference to FIG. 5 instead of FIG. 3.

Figure 5:
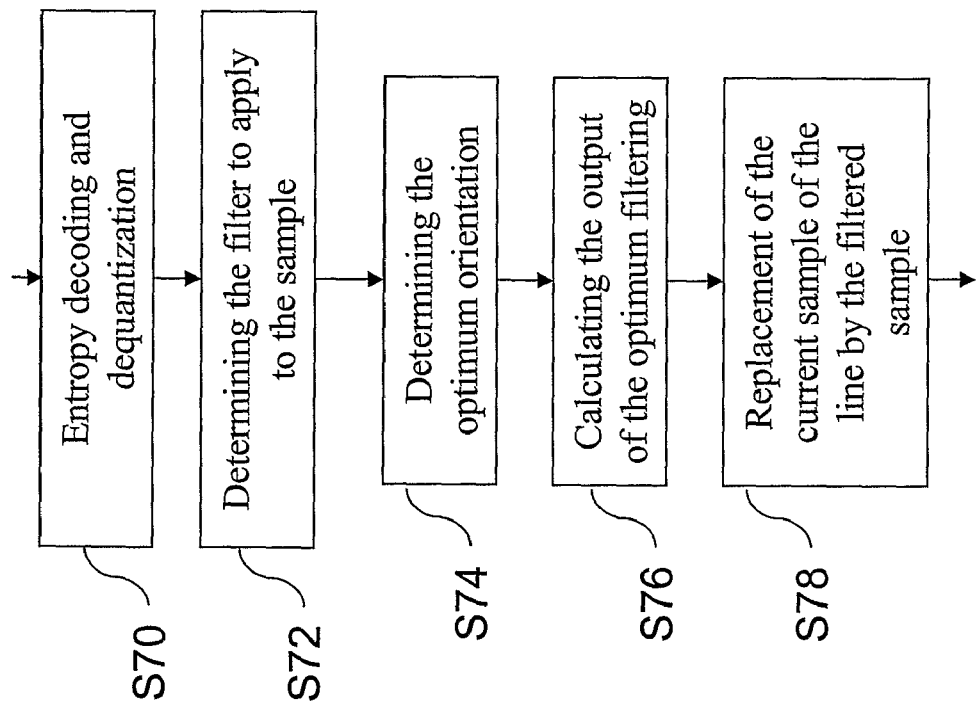
FIG. 5 shows the decoding, dequantizing and inverse filtering algorithm applied to an encoded sample.

The algorithm in FIG. 5 starts with the partial decoding step S70 consisting in decoding entropically the samples of the encoded digital image and in dequantizing these samples.

The entropy decoding is, in particular, Huffman decoding or arithmetical decoding according to the entropy encoding used.

As regards dequantization, this may, for example, be scalar dequantization or vectoral dequantization according to the dequantization used.

Step S70 is followed by step S72 consisting in determining the inverse filter to be applied to the filtered samples. This step S72 is similar to step S50 in FIG. 3 described previously. Thus, at the end of this step, the inverse filter to be applied is determined.

Step S72 is then followed by step S74 for the determination of the geometric orientation in which the inverse filter is to be applied. To do this, external information representing the geometric orientation is used.

As a matter of fact, when the image has been filtered a first time with a view to decomposing it into frequency sub-bands, the information of the geometric orientation used for the filtering operation related to each sample has been stored, possibly encoded, and is available to the decoder.

Thus, during inverse filtering, the filtering corresponding to the geometric orientation determined during the filtering decomposition is applied.

Step S74 is followed by step S76 consisting in calculating the output of the inverse filtering in the geometric orientation previously determined by the current filtered sample.

This step is then followed by step S78 for the replacement of the current filtered sample by the value obtained for the sample that has been subject to the inverse filtering.

Figure 6:
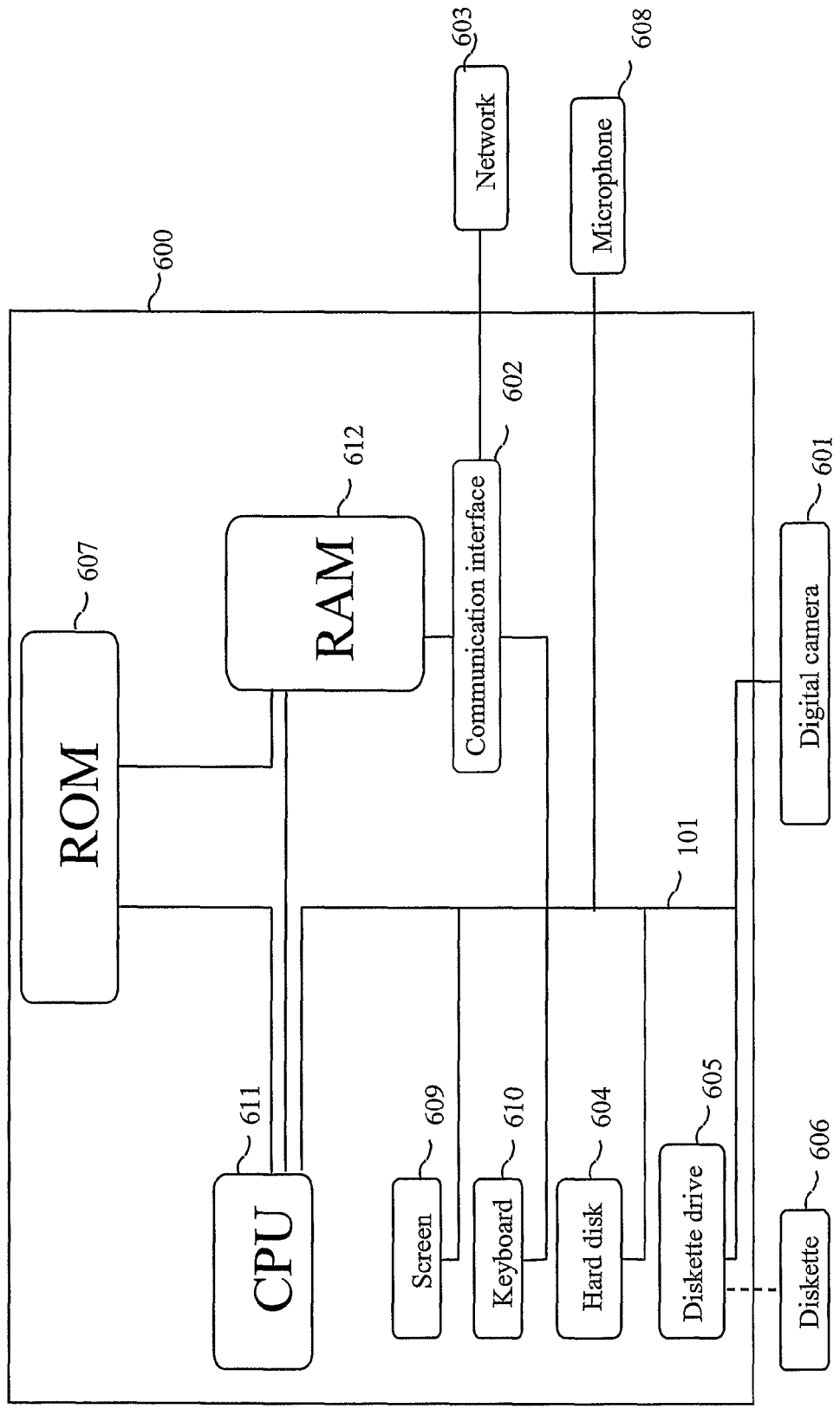
FIG. 6 shows diagrammatically an apparatus in which the invention is implemented.

With reference to FIG. 6, a device able to operate as a device for filtering a multidimensional digital signal and/or a device for encoding a multidimensional digital signal and/or a device for decoding an encoded multi-dimensional digital signal according to the invention is now described in its material configuration.

The information processing device in FIG. 6 has all the means necessary for implementing the method of filtering a multidimensional digital signal and/or the method of encoding a multidimensional digital signal and/or the method of decoding an encoded multidimensional digital signal according to the invention.

According to the embodiment selected, the device may for example be a microcomputer 600 connected to different peripherals, for example, a digital camera 601 (or a scanner, or any other means of image acquisition or storage) connected to a graphics card and thus supplying the information to be processed according to the invention.

The microcomputer 600 preferably comprises a communication interface 602 connected to a network 603 able to transmit digital information. The microcomputer 600 also comprises a storage means 604, such as for example a hard disk, and a diskette drive 605.

The diskette 606 like the disk 604 may contain invention software set-up data as well as the invention code which, once read by the microcomputer 600, will be stored on the hard disk 604.

According to one variant, the program or programs allowing the device 600 to implement the invention are stored in a read-only memory ROM 607.

According to another variant, the program or programs are received wholly or partially via the communications network 603 to be stored as indicated.

The microcomputer 600 may also be connected to a microphone 608 by means of an input/output card (not shown). The microcomputer 600 also comprises a screen 609 to display the information to process and/or to act as an interface with the user, so that the user can for example parameterise certain processing modes by means of the keyboard 610 or any other appropriate means such as a mouse.

The Central Processing Unit CPU 611 executes the instructions relating to the implementation of the invention, these instructions being stored in the read-only memory ROM or in the other storage elements described.

When powering up, the processing programs and methods stored in one of the non-volatile memories, for example the ROM 607, are transferred to the random access memory RAM 612 which will then contain the executable code of the invention as well as the variables necessary for the invention to be implemented.

As a variant, the methods for processing the digital signal may be stored in different storage locations in the device 600. Generally speaking, an information storage means that can be read by a computer or by a microprocessor, whether or not integrated into the device, possibly removable, stores a program the execution of which implements the filtering, encoding and decoding methods. It is also possible to expand the embodiment of the invention, for example by adding updated or improved processing methods which are transmitted by the communications network 603 or loaded by means of one or more diskette 606. Of course, the diskette 606 can be replaced by any information medium such as a CD-ROM or memory card.

A communication bus 613 allows communication between the different elements of the microcomputer 600 and the elements connected to it. It will be noted that the representation of the bus 613 is not restrictive. As a matter of fact, the Central Processing Unit CPU 611 is, for example, able to communicate instructions to any element of the microcomputer 600, directly or by means of another element of the microcomputer 600.

Clearly, the present invention is in no way restricted to the embodiments described and shown, but encompasses, quite on the contrary, any variant within the reach of the man skilled in the art.

The invention claimed is:

1. A method of filtering a multidimensional digital signal comprising a plurality of samples, wherein for each of the samples to filter the method comprises:
    simulating the filtering of the sample to filter by applying at least one filter in a plurality of geometric orientations in the digital signal, the simulation resulting in a plurality of simulated filtering values of the sample; and
    obtaining a filtering value of the filtered sample on the basis of the plurality of simulated filtering values of the sample according to at least one predetermined criterion;
    wherein the filtering value obtained according to the at least one predetermined criterion corresponds to the value from the plurality of simulated filtering values of the sample that minimizes the rate of transmission of the filtered and encoded samples.

2. A method according to claim 1, wherein the step of obtaining the filtering value comprises selecting a value from the plurality of simulated filtering values.

3. A method according to claim 1, wherein the step of obtaining the filtering value comprises:
    determining a geometric orientation among the plurality of geometric orientations in the digital signal on the basis of the plurality of simulated filtering values; and
    applying the filtering in the determined geometric orientation.

4. A method according to any one of claims 1 to 3, wherein prior to the step of simulating the filtering, the method comprises a step of determining at least one filter among a plurality of filters.

5. A method according to claim 4, wherein the plurality of filters comprises at least one low pass filter and a high pass filter.

6. A method according to any one of claims 1 to 3, wherein the filtering value obtained according to the at least one predetermined criterion corresponds to the smallest absolute value from the plurality of simulated filtering values of the sample.

7. A method according to one of claims 1 to 3, wherein the filtering value obtained according to at the least one predetermined criterion corresponds to the value from the plurality of simulated filtering values of the sample that minimizes the errors.

8. A method according to any one of claims 1 to 3, further comprising obtaining the predetermined criterion from information stored in a memory means.

9. A method according to any one of claims 1 to 3, further comprising obtaining information representing the geometric orientation of the filter applied to the sample.

10. A method according to claim 9, further comprising associating information with the filtered sample, the information representing the geometric orientation of the filter applied to the sample.

11. A method according to any one of claims 1 to 3, further comprising associating information with the filtered sample, the information representing the filter applied to the sample.

12. A method according to any one of claims 1 to 3, wherein the steps of the filtering method are successively applied to each of the dimensions of the digital signal.

13. A computer program stored on a computer-readable memory medium, said program containing instructions which when loaded into a computer system cause the computer system to implement the method of filtering a multidimensional digital signal comprising a plurality of samples according to any one of claims 1 to 3, when that program is loaded and executed by the computer system.

14. A method of encoding a multidimensional digital signal comprising a plurality of samples, the method comprising:
- filtering the samples of the digital signal, wherein for each of the samples to filter, filtering comprises:
- simulating the filtering of the sample to filter by applying at least one filter in a plurality of geometric orientations in the digital signal, the simulation resulting in a plurality of simulated filtering values of the sample; and
- obtaining a filtering value of the filtered sample on the basis of the plurality of simulated filtering values of the sample according to at least one predetermined criterion.
- the method of encoding further comprising:
- associating information with the filtered sample, the information representing the geometric orientation of the filter applied to the filtered sample; and
- encoding the filtered sample with loss with respect to the filtered data and without loss with respect to the information representing the geometric orientation.

15. A method according to claim 14, wherein the filtering of samples of the digital signal used in application of a lifting scheme is performed with at least two filters which are each applied to different samples.

16. A method of decoding an encoded multidimensional digital signal comprising a plurality of encoded samples, the method comprising:
- partial decoding leading to a plurality of filtered samples, and
- inverse filtering applied to the filtered samples, the inverse filtering being performed on a filtered sample in the geometric orientation of the filter which was used for the filtering of the sample during the encoding thereof according to the encoding method in accordance with claim 14.

17. A method according to claim 16, wherein the geometric orientation is defined on the basis of the information representing the geometric orientation of the filter applied to that sample and which is associated with the filtered sample.

18. A method according to claim 17, further comprising obtaining information representing the geometric orientation from a memory means.

19. A method according to claim 16, wherein filtering of samples of the filtered digital signal used in application of a lifting scheme is performed with at least two filters which are each applied to different samples.

20. A computer program stored on a computer-readable storage medium, said program containing instructions which when loaded into a computer system cause the computer system to implement the method of decoding an encoded multidimensional digital signal comprising a plurality of encoded samples according to claim 16, when that program is loaded and executed by the computer system.

21. A computer program stored on a computer-readable memory medium, said program containing instructions which when loaded into a computer system cause the computer system to implement the method of encoding a multidimensional digital signal comprising a plurality of samples according to claim 14, when that program is loaded and executed by the computer system.

22. A device for encoding a multidimensional digital signal comprising a plurality of samples, the device comprising:
- means for simulating the filtering of the sample to filter by applying at least one filter in a plurality of geometric orientations in the digital signal, the simulation means generating a plurality of simulated filtering values of the sample; and
- means for obtaining a filtering value of the filtered sample on the basis of the plurality of simulated filtering values of the sample according to at least one predetermined criterion;
- the device for encoding further comprising:
- means for associating information with the filtered sample, the information representing the geometric orientation of the filter applied to the filtered sample; and
- means for encoding the filtered sample with loss with respect to the filtered data and without loss with respect to the information representing the geometric orientation.

23. A device according to claim 22, wherein the means for obtaining the filtering value is constructed to select a value from the plurality of simulated filtering values.

24. A device according to claim 22, wherein the means for obtaining the filtering value comprises:
- means for determining a geometric orientation adapted to determine a geometric orientation among the plurality of geometric orientations in the digital signal on the basis of the plurality of simulated filtering values; and
- means for applying the filtering in the determined geometric orientation.

25. A device according to any one of claims 22 to 24, further comprising determining means for determining at least one filter among a plurality of filters.

26. A device according to claim 25, wherein the plurality of filters comprises at least one low pass filter and a high pass filter.

27. A device according to any one of claims 22 to 24, further comprising means for obtaining the predetermined criterion from information stored in a memory means.

28. A device according to any one of claims 22 to 24, further comprising means for obtaining information representing the geometric orientation of the filter applied to the sample.

29. A device according to claim 28, further comprising means for associating information with the filtered sample, the information representing the geometric orientation of the filter applied to the sample.

30. A device according to any one of claims 22 to 24, further comprising means for associating information with the filtered sample, the information representing the filter applied to the sample.

31. A device according to any one of claims 22 to 24 wherein the filtering of samples of the digital signal used in application of a lifting scheme is performed with at least two filters which are each applied to different samples.

32. A device for decoding an encoded multidimensional digital signal comprising a plurality of encoded samples, the device comprising:
- means for partial decoding generating a plurality of filtered samples, and
- inverse filtering means for applying an inverse filter to the filtered samples, the inverse filtering being performed on a filtered sample in the geometric orientation of the filter which was used for the filtering of the sample during the encoding thereof by an encoding device in accordance with claim 22.

33. A device according to claim 32, wherein the geometric orientation is defined on the basis of the information representing the geometric orientation of the filter applied to that sample and which is associated with the filtered sample.

34. A device according to claim 33, further comprising means for obtaining information representing the geometric orientation from a memory means.

35. A device according to claim 32, wherein filtering of samples of the filtered digital signal used in application of a lifting scheme is performed with at least two filters which are each applied to different samples.

36. A telecommunications system comprising a plurality of terminal devices connected via a telecommunications network, characterized in that the system comprises at least one terminal device equipped with an encoding device for encoding a multidimensional digital signal comprising a plurality of samples according to claim 22 and at least one terminal device equipped with a decoding device for decoding an encoded multidimensional digital signal comprising a plurality of encoded samples, the decoding device including means for partial decoding to generate a plurality of filtered samples, and inverse filtering means for inverse filtering the filtered samples, the inverse filtering being performed on a filtered sample in a geometric orientation of a filter that was used by the encoding device during encoding to produce the filtered sample.

* * * * *